Feb. 12, 1952     R. BREZEK     2,585,220
AIR INLET STRUCTURE FOR THE ENGINE COMPARTMENT OF
STREAMLINED VEHICLES HAVING REAR ENGINES
Filed Feb. 27, 1948

Inventor:
Rudolf Brezek,
by Singer, Ehlert, Stern & Carlberg
Attorneys.

Patented Feb. 12, 1952

2,585,220

UNITED STATES PATENT OFFICE 2,585,220

AIR INLET STRUCTURE FOR THE ENGINE COMPARTMENT OF STREAMLINED VEHICLES HAVING REAR ENGINES

Rudolf Břežek, Prague-Smichov, Czechoslovakia, assignor to Tatra narodni podnik, Koprivnice, Czechoslovakia Application February 27, 1948, Serial No. 11,789
In Germany June 5, 1943

Section 1, Public Law 690, August 8, 1946
Patent expires June 5, 1963

3 Claims. (Cl. 180—54)

As is well known, the most intricate problem to be solved in streamlined motor vehicles with rear engine is the admission of an adequate amount of cooling air into the engine space. The most current solution of this problem is the arrangement of apertures on different places of the vehicle body, connected to the engine space, the penetration of air into such openings being enhanced by various surfaces projecting out of the streamlined shape.

As a considerable amount of air is necessary, such openings, as well as the respective directing surfaces, must have a substantial size which is not only detrimental to the appearance of the car but also to the aerodynamic efficiency of the vehicle body.

According to the present invention narrow slots are provided instead of the large openings and the large directing surfaces. These slots extend around a substantial portion of the vehicle body cross section at a convenient place, preferably between the rear wall of the useful vehicle space and the engine space. The total length of such a slot being subdivided by partitions into a plurality of smaller slots arranged side-by-side in such manner that both walls, i. e. the inwardly retracting useful space wall and the engine space wall between which the slot is provided, are kept at a fixed distance from each other. The total cross section of such a slot may be substantially larger than the hitherto used large individual openings, without being detrimental to the appearance of the car or to the efficiency of the streamlined shape of the body.

Figure 1:
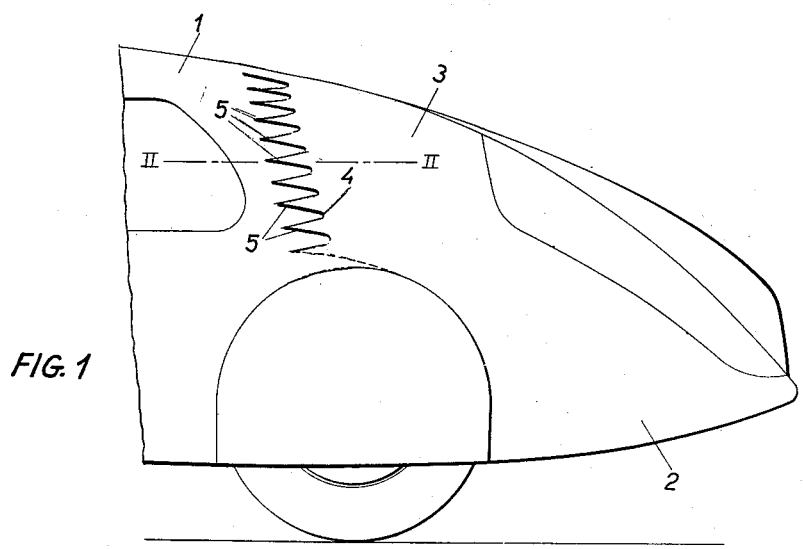
Figure 2:
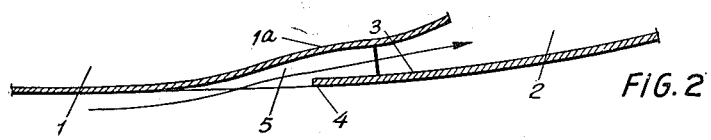

The accompanying drawing illustrates diagrammatically, by way of example merely, an embodiment of the present invention, Fig. 1 showing a side view, Fig. 2 a cross section on the line II—II in Fig. 1.

Figure 3:
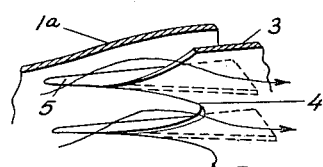

Fig. 3 is a perspective view of the air duct construction of Fig. 1.

Behind the useful space 1 there is the engine space 2, into which from both sides and eventually from the top wide air ducts are directed. Said ducts are formed between the spaced and overlapping margins of the body walls 1ª and 3, terminating into a long slot which by a plurality of lengthwise extending cross walls 5 is subdivided into a plurality of apertures lying close side-by-side. These air ducts, as shown in Fig. 1 extend transversely of the vehicle body from adjacent the highest point of the rear wheel mudguards to a point near the top of the body. These cross walls at the same time hold both walls, i. e. the vehicle wall proper 1ª and the engine space wall 3 at a fixed mutual distance whereby the total strength of the vehicle is further increased. In order to improve the appearance of the vehicle and at the same time to increase the strength it is possible to extend the forward edge of the engine space wall 3, in a tongue-like manner over the ribs 5 forwardly so as to cover the ribs 5 along the entire length, as shown in Fig. 3, thereby giving the forward edge of the wall 3 a zig-zag appearance.

This arrangement presents the further advantage that an adequate length of the slot, measured at the circumference in a transverse direction of the vehicle, as well as an adequate slot with respect to depth between both the body and engine walls may be chosen in accordance with the necessary engine cooling and engine aerating requirements.

By conveniently arranging the slot direction transversely with regard to the vehicle body it is also possible to improve the appearance of the vehicle without in any way adversely affecting the efficiency of the streamlined shape of the body.

I claim:

1. In a streamlined motor vehicle with a rear engine, a vehicle body provided in each of its sides with a transverse air inlet slot between the useful space of the body and the engine space and extending from a point above the vehicle mudguard to a point short of the top of the vehicle body, an air guiding channel formed in rear of said slot by inwardly bent portions of the side walls of the vehicle body, and a series of parallel flat ribs seated in said air channel and subdividing said transverse slots into a series of air inlet openings.

2. In a streamlined motor vehicle with a rear engine, a vehicle body provided in each of its sides with a transverse air inlet slot between the useful space of the body and the engine space and extending from a point above the vehicle mudguard to a point short of the top of the vehicle body, an air guiding channel formed in rear of said slot by inwardly bent portions of the side walls of the vehicle body, and a series of parallel flat ribs seated in said air channel and subdividing said transverse slots into a series of air inlet openings, the rear edge of said slots being extended forwardly in a tongue-like manner over said ribs up to the front rim of said slots.

3. In a streamlined motor vehicle with a rear engine, a vehicle body provided with transverse air inlet slots between the useful space of the body and the engine space and extending from a point above each rear mudguard to a point short of the longitudinal center of the top of the vehicle body, said transverse slots extending thereby in both sides of said vehicle body and in a portion of the top of the same, an air guiding channel formed in rear of said slot by an inwardly bent portion of the side walls and the top wall of said vehicle body, and a series of parallel flat ribs arranged in said channel and subdividing said transverse slot into a series of air inlet openings, the margin of the body wall forming the rear edge of said transverse slot being extended in tongue-like manner over said ribs up to the front marginal portion of said slot.

RUDOLF BŘEZEK.

REFERENCES CITED

The following references are of record in the file of this patent:

UNITED STATES PATENTS

| Number | Name | Date |
| --- | --- | --- |
| 2,064,380 | Ledwinka | Dec. 15, 1936 |
| 2,199,316 | Klavik | Apr. 30, 1940 |

FOREIGN PATENTS

| Number | Country | Date |
| --- | --- | --- |
| 53,925 | Netherlands | Jan. 16, 1943 |
| 61,026 | Denmark | June 15, 1943 |
| 874,364 | France | May 4, 1942 |